March 25, 1969 R. C. SWANSON 3,435,206
PORTABLE FLUORESCENT LAMP
Filed Dec. 19, 1966 Sheet 1 of 2

INVENTOR.
RICHARD C. SWANSON
BY Williamson, Palmatier
& Bains ATTORNEYS

March 25, 1969 R. C. SWANSON 3,435,206
PORTABLE FLUORESCENT LAMP
Filed Dec. 19, 1966 Sheet 2 of 2

INVENTOR.
RICHARD C. SWANSON
BY
Williamson, Palmatier
& Bains   ATTORNEYS

United States Patent Office 3,435,206
Patented Mar. 25, 1969

3,435,206
PORTABLE FLUORESCENT LAMP
Richard C. Swanson, 9331 Clinton Ave.,
Minneapolis, Minn. 55420
Filed Dec. 19, 1966, Ser. No. 602,842
Int. Cl. F21l 3/00
U.S. Cl. 240—11.4          6 Claims

ABSTRACT OF THE DISCLOSURE

A fully portable fluorescent lamp having an internal D.C. power source, a transistor inverter circuit including a transformer for converting the low D.C. voltage output of said D.C. power source to relatively high voltage, high frequency alternating current supplied to a fluorescent tube, and a recharging circuit by means of which said internal power source may be recharged from an external D.C. power source. An electrical connector may be utilized to connect the external power source in the transistor inverter circuit to energize same; and a special secondary winding of the aforesaid transformer connected in said recharging circuit in series with said internal power source receives an induced voltage from said inverter circuit to accomplish the recharging of said internal power source.

---

This invention relates to a portable fluorescent lamp and, more particularly, relates to a rechargeable portable fluorescent lamp which operates at a high frequency thereby providing a high intensity light while consuming a low amount of energy.

Of the portable fluorescent lamps which are presently available, many are not truly portable even though they are presented as portable lamps. Some of the portable lamps require a connection between the lamp and a source of power, for instance the battery in an automobile, and consume a large amount of energy per unit of light output. Other "portable" lamps utilize dry batteries of from 90 to 150 volts thereby making the "portable" lamps impractical in that battery life is very short. Typical uses of a portable lamp are for camping, hiking, boating and other outdoor activities and emergency purposes which require extreme flexibility and convenience. Oftentimes, a lamp which must be connected to an external source of power becomes impractical in any of the above mentioned uses and, further, a lamp which is extremely heavy is too inconvenient to consider. Also, a lamp with a short battery life cannot be tolerated because it is not economically feasible. The lamps which have recognized the above problems and have been developed to satisfy the great need for a portable fluorescent lamp, operate at such low frequencies that in order to obtain an appreciable degree of light intensity, a high amount of energy is consumed. Further, the low frequency lamp emits sound audible to humans and animals. A device which properly and efficiently illuminates a tent or campsite, in a way that a spotlight or flashlight cannot accomplish, but which is annoying to the user and nearby animals, cannot be tolerated.

With these comments in mind it is to the elimination of these and other disadvantages to which the present invention is directed along with the inclusion therein of other novel and desirable features.

An object of my invention is to provide a new and improved portable fluorescent lamp of simple and inexpensive construction and operation.

Another object of my invention is to provide a novel portable fluorescent lamp which provides high lighting intensity while utilizing low energy.

Still another object of my invention is the provision of a portable fluorescent lamp which operates at a frequency level inaudible to humans and animals thereby providing a lamp which may be used at a campsite without annoying the user and without annoying or scaring nearby animals.

Still another object of my invention is the provision of a portable fluorescent lamp which utilizes an inexpensive, lightweight battery which may be recharged from any convenient source of direct current such as an automobile battery.

A further object of my invention is the provision of a portable fluorescent lamp which may be operated from an automobile battery and which may be recharged therefrom utilizing a circuit which is so efficient that there is almost no charging loss to the automobile battery.

These and other objects and advantages of my invention will more fully appear from the following description made in connection with the accompanying drawings wherein like reference characters refer to the same or similar parts throughout the several views, and in which.

Figure 1:
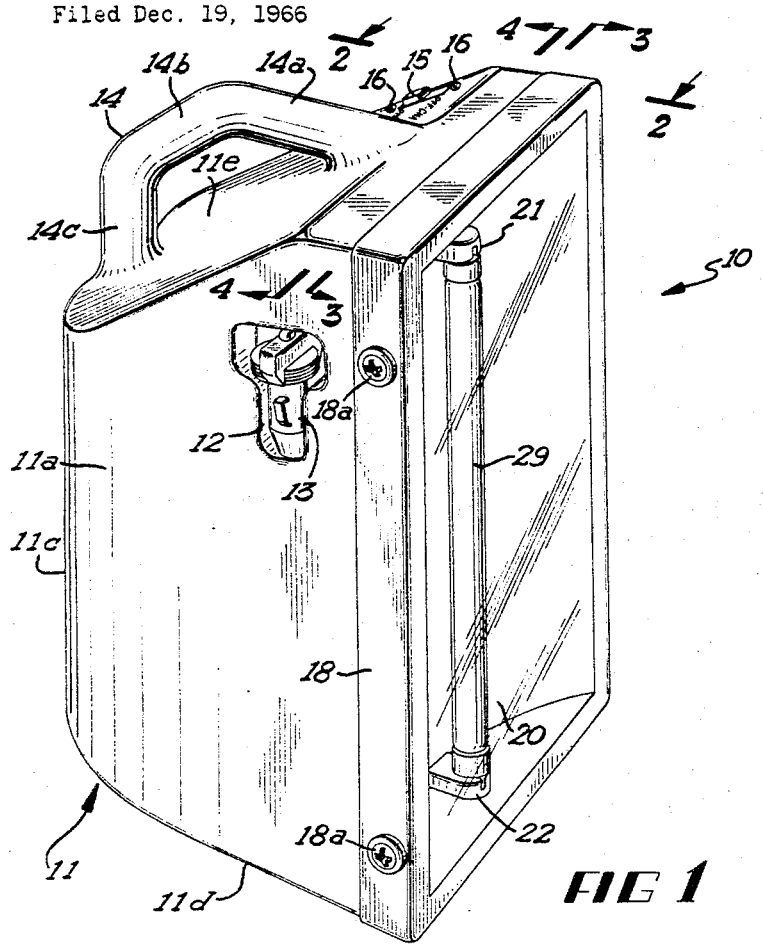
FIG. 1 is a perspective view showing the portable fluorescent lamp of my invention.
Figure 4:
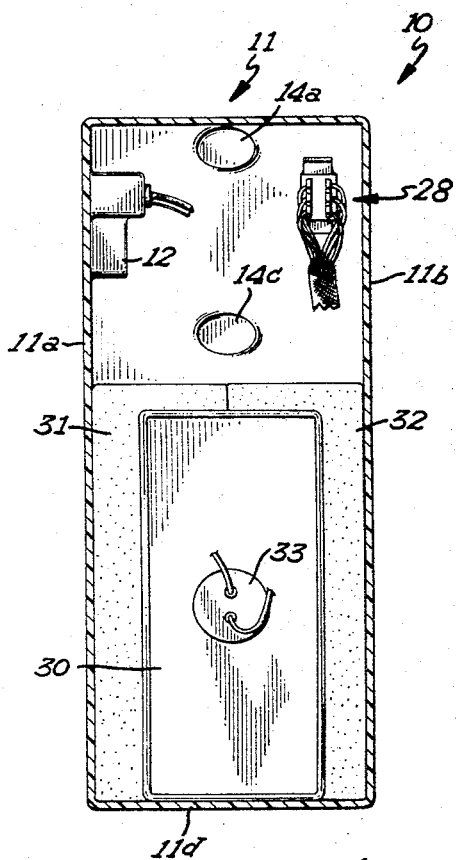
FIG. 4 is a sectional view taken along the line 4—4 of FIG. 1.
Figure 3:
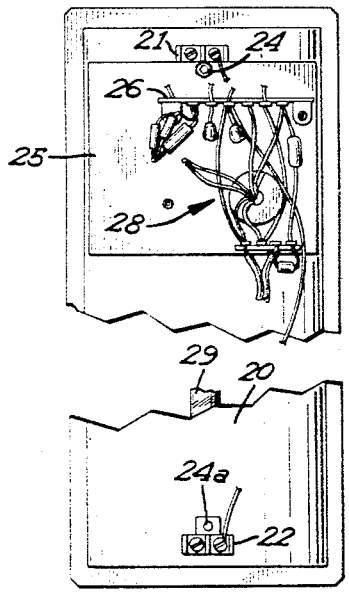
FIG. 3 is a sectional view taken along the line 3—3 of FIG. 1.

The portable fluorescent lamp is indicated, in general, by numeral 10 and comprises a housing or casing 11 which is constructed of a rigid, impact resistant plastic such as polyvinyl chloride and may be molded in one piece by using rotational molding techniques. The casing 11 includes upright sidewalls 11a and 11b which are parallel and spaced apart, an upright rearward semicircular portion 11c which is integral with sidewalls 11a and 11b and a front opening which is adapted to receive the battery and fluorescent lamp. A bottom panel 11d and an angulated upper panel 11e complete integral casing 11. A DC insert or plug recess 12 is included in casing wall 11a and is substantially T-shaped. This recess accommodates and snugly holds a DC insert or plug 13 which is shown detachably inserted in recess 12 in FIG. 1. The D.C. insert is commercially available and is adapted for use in the cigarette lighter receptacle of an automobile, truck or boat utilizing a 12 volt, negative ground system. Recess 12 converges from the inner portion of the casing to the outer portion of the casing thereby retaining insert 13 within recess 12 by the snug fitting relation therebetween. As shown in FIG. 4, the recess configuration is adapted to receive insert 13 in such a way that the insert may be inserted so that it is flush with the casing and does not project outside of the casing or housing wall.

Recess 12 may, of course, be of a configuration other than that shown in the drawings in order to accommodate an insert other than insert 13 which is shown in the drawings and described herein. Handle 14 is an integral part of the casing or housing 11. The handle includes a forward portion 14a, an intermediate portion 14b and a rear portion 14c. Front portion 14a is located to permit the operator of lamp 10 to carry the lamp with the forward portion 14a thereof to permit projection of light forwardly of the user when the hand of the user is in a normal carrying position at the side of the user. Alternately, a user may wish to more directly aim or otherwise direct the light, and portion 14b is therefore angulated approximately 45 degrees downwardly from portion 14a so that the user will have a comfortable grip when directing the lamp. Handle portion 14c may also be used in directing the light, typically from the position wherein the operator's hand is raised above the waist. A two-position switch 15 is shown attached to upper surface 11e as by screw assemblies 16. The switch is a commercially available two position switch interposed in the electric circuit of the lamp.

Figure 2:
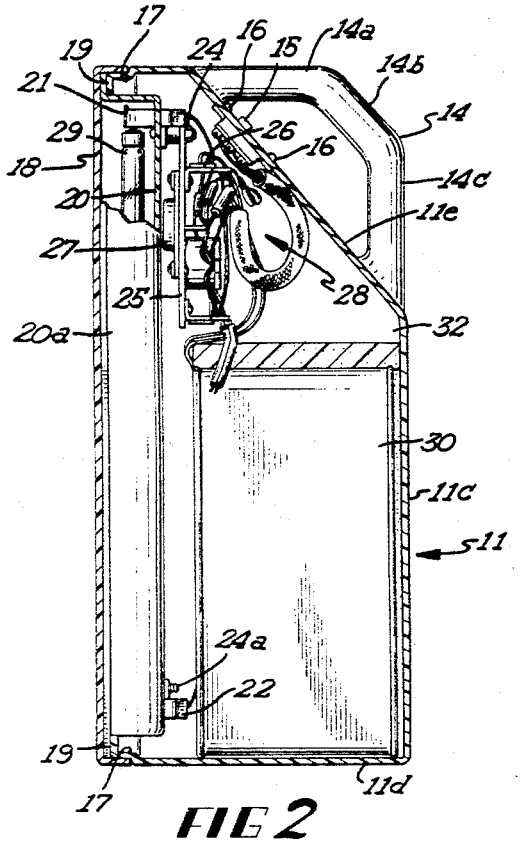
FIG. 2 is a sectional view of my portable fluorescent lamp taken along the line 2—2 of FIG. 1.

Housing 11 includes a lens receiving portion 17 shown in FIG. 2. This is a peripheral portion at the front opening of the housing which is recessed from casing 11 to permit lens 18 which is shaped in the manner of a telescoping carton cover, to mate with lens receiving portion 17 of casing 11 and to be flush with casing 11 at the point of attachment of lens 18 to casing 11. Lens 18 is assembled to casing 11 using screw assemblies 18a. Further, a peripheral reflector engaging and supporting portion 19 depending from lens receiving portion 17 retains reflector 20 properly positioned between lens 18 and reflector engaging and supporting portion 19, thereby retaining reflector 20 upright and in proper alignment with casing 11. The lens is constructed of a clear, transparent plastic such as Plexglas of styrene. The reflector is typically vacuum formed and of a white, highly reflective plastic having a curved reflecting surface 20a with the degree type of curvature as desired.

An upper fluorescent tube receiving socket 21 and lower tube receiving socket 22 are affixed to reflector 20 as by screw and nut assemblies 24 at the upper end and 24a at the lower end. The upper screw and nut assembly 24 also mounts an aluminum heat sink 25 onto reflector 20 in an upright position parallel to the inner side of reflector 20a and spaced therefrom. A terminal strip 26 is affixied to the aluminum heat sink 25 on the inner side thereof and a transistor 27 is affixed to heat sink 25 substantially between reflector 20 and heat sink 25. Heat sink 25 is an aluminum member having approximate dimensions of from one sixteenth to one eighth inch thick and an area of twenty square inches and is adapted to dissipate the heat from the transistor thereby affording protection to the transistor. The terminal strip 26 receives the circuitry components indicated, in general, by numeral 28 and described in detail hereinbelow.

A fluorescent tube 29 is inserted in upper socket 21 and lower socket 22 and is selected from standard, commercially available fluorescent tubes having approximately ⅝ inch diameter and a length of 12 inches. Of course, varying sized tubes may be utilized and it will be understood that the sizes and capacities stated herein are typical and in no way limit the scope of this invention. A standard, commercially available battery of about 13½ volts is indicated by numeral 30 and is maintained within casing 11 by a pair of mating L-shaped Styrofoam blocks 31 and 32 which, as best shown in FIG. 4, are positioned in an inverted U-shaped cushion about battery 30 snugly maintaining it between the walls 11a and 11b of housing 11. Battery plug 33 is provided and connects the battery to the circuit components 28 in the manner described below.

Figure 5:
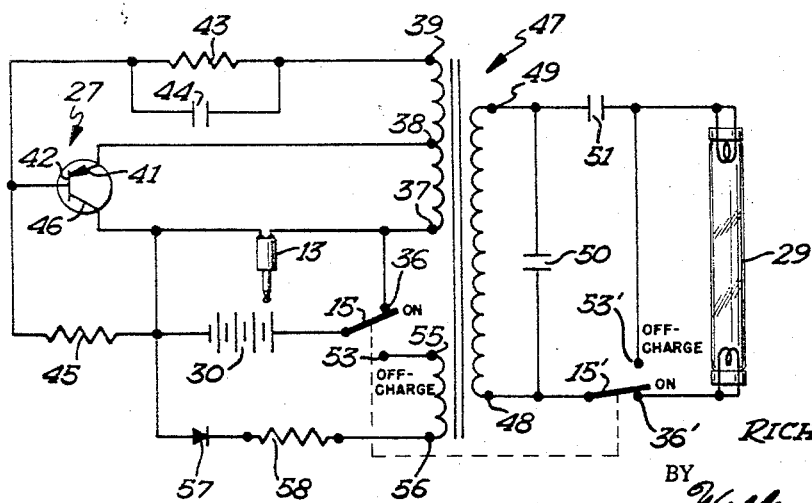
FIG. 5 is a schematic view of the circuit diagram of the portable fluorescent lamp of my invention.

The operation of the portable fluorescent lamp will be described with reference to the circuit diagram shown in FIG. 5 with switches 15–15' in the "on" position and beginning with internal battery 30 current flow is through switch 15 which is engaged with contact point 36 and 36'. Current flows through primary transformer winding which has six turns and which is defined between points 37 and 38. The current flowing through first primary transformer windings between points 37 and 38 induces a voltage across second primary windings defined between points 38 and 39 and having three turns. The current then flows to transistor 27 to the emitter portion 41 thereof, to the base portion 42 and then through current limiting resistor 43, having a resistance of 47 ohms, which is in parallel with pulse conditioning capacitor 44, having a capacitance of one microfarad. Transistor 27 is a standard, commercially available unit of the Germanium PNP type. This current path is considered the base drive for the transistor 27. A resistor 45 having a resistance of 3,900 ohms, is connected to collector portion 46 of transistor 27 and to the base portion 42 thereof to provide a forward bias or turn-on signal for the fluorescent lamp. Resistor 45 is in parallel with collector 46 and base 42 of transistor 27. Current continues to flow through the windings defined between points 37 and 38 and to the transistor 27 until the transformer core, indicated, in general, by numeral 47, is saturated. At the point of saturation of the transformer core the induced voltage in the second primary winding between points 38 and 39 begins to decrease causing transistor 27 to turn-off; a complete reverse of all voltages in the circuit occurs, the transistor turns off, resulting in the current decreasing to zero thereby returning to starting conditions and beginning the next cycle as above. It should be noted that when the lamp has started, resistor 45 no longer contributes to the operation of the lamp and a minimum of current flows therethrough.

The first primary transformer voltage defined or measured between points 37 and 38 is stepped up through transformer action to secondary windings which are defined between points 48 and 49, having 220 turns. A secondary capacitor 50, having capacitance of .002 microfarad is in parallel with windings defined between points 48 and 49 and acts as a wave forming device. Current flow is through capacitor 51 and lamp 29 which are in parallel with capacitor 50 exciting the lamp. Once the arc is struck and the lamp is operating, higher current begins to flow and capacitor 51 acts as a ballast maintaining the current at a predetermined level.

To charge the lamp from a source of 12 volts direct current, such as an automobile battery, insert 13 is inserted into the cigarette lighter receptacle in the automobile. Switch 15 is placed in contact with contacts 53 and 53', the off-charge position. Battery 30 is now connected across the additional secondary windings of transformer 37 defined between 55 and 56, the additional secondary winding having 12 turns. Energy from the 12 volt battery drives the transistor inverter circuit as described above with the additional secondary windings defined between 55 and 56 taking the place of secondary windings defined between 49 and 48. Current flow is then into the positive side of the battery, out of the negative side, through a standard, commercially available diode 57 and then through current limiting resistor 58, having a resistance of 10 ohms, thereby recharging battery 30. Utilizing the inverter circuit the 13½ volt battery 30 may be recharged from an external voltage source of 12 volts in that 20 to 25 volts (no load) may be measured across points 55 and 56.

When switch 15 is in the off-charge position, capacitor 51 is in parallel with capacitor 50, decreasing the operating frequency during the charging cycle. This results in increased efficiency during the charging operation due to the lower operating frequency of the transistor and the subsequent lower heat which is created therein. Further, the addition of a switch position which would place switch 15 in contact with contacts 36 and 53 while maintaining switch 15' in contact with point 36' only will allow charging simultaneous with driving the lamp.

From the foregoing it will be seen that the portable fluorescent lamp of my invention is ideally suited for use by campers, hunters, and the like who desire lighting for a tent or campsite which is not a "beam"-type and which does not draw a large amount of energy per light intensity. The portable lamp of this invention is designed for portability; the power unit is necessarily small and the circuit is designed to give high intensity light while consuming a low amount of energy. This allows the user to efficiently transport the light and operate the light for a long period of time without the necessity for recharging the battery or transporting a large, heavy battery.

Further, the portable fluorescent lamp of my invention operates at a frequency level above that audible to humans and to animals. The high frequency operation is typically between 12,000 and 24,000 cycles although obvious adjustments in the transformer core, the battery size and the turns on the primary winding will vary the frequency and hence the efficiency of the portable fluorescent lamp.

Further, the use of an NPN, silicon transistor will increase the efficiency of the unit and will result in an operating frequency of up to 50,000 cycles. The circuit is designated such that insertion of the receptacle insert into, for example, an automobile cigarette lighter receptacle on, for example, a truck having a 12 volt positive ground, will result in no injury whatsoever to the portable fluorescent lamp.

It will, of course, be understood that various changes may be made in form, details, arrangement and proportions and parts without departing from the scope of my invention.

What is claimed is:

1. A portable fluorescent lamp adapted to produce high intensity light at low energy consumption, said portable fluorescent lamp comprising,
   a housing having a front reflector receiving opening,
   a reflector inserted in said housing adjacent said opening,
   a lens positioned across said front opening in front of reflector,
   means securing said lens to said housing,
   a fluorescent lamp attached to said reflector,
   transistor inverter circuit means adapted to convert direct current power to alternating current power operably connected to said fluorescent lamp, whereby said fluorescent lamp is adapted to produce high intensity light at low energy consumption, said circuit means exciting said fluorescent lamp at frequencies generally above 10,000 cycles.
   internal electric current supply means mounted in said housing operably connected to said circuit means and adapted to supply direct current to said circuit means,
   recharging apparatus whereby said internal electric current supply means may be recharged from external electric current supply means having voltage less than the voltage in said internal electric current means, said recharging apparatus comprising,
      connecting means operably connecting said transistor inverter circuit means to external electric current supply means in parallel with said internal electric current supply means whereby the external power supply means drives said inverter circuit means, and
      transformer winding means operably connected in series to said internal electric current supply means and adapted to receive current from said inverter circuit means whereby the voltage measured across said transformer winding means is greater than the voltage of the external electric current supply means thereby recharging said internal electric current supply means.

2. In a portable fluorescent lamp having a housing with a front reflector receiving opening, a lens covering the the reflector and secured to the housing retaining the reflector in position, a fluorescent lamp attached to the reflector and an internal electric current supply means mounted in the housing, circuit means operably connected to the fluorescent lamp whereby the fluorescent lamp gives off a high intensity light utilizing low energy consumption, said circuit means comprising,
   a transistor inverter circuit adapted to convert direct current to alternating current connected in parallel to the internal electric current supply means, said transistor inverter circuit means comprising a transformer having first primary transformer windings, second primary windings, secondary windings and additional secondary windings,
   a transistor connected to said transformer, said transistor having an emitter, a base and a collector, said first primary windings of said transformer being connected at said emitter and said second primary windings being connected to the emitter whereby a portion of the current flow is to the base of the said transistor and the other portion is to the collector to return to the internal electric current supply means establishing a collector current,
   a current limiting resistor in series with the transistor base and said second primary windings whereby a transistor base drive is established, and whereby the collector current provides alternating current across the first primary windings,
   a fluorescent lamp exciting circuit connected in parallel with said fluorescent lamp and adapted to receive alternating current from said secondary windings of said transformer,
   switch means interposed in said inverter circuit and said exciting circuit whereby the electric current supply means may be controlled,
   a recharging circuit adapted to recharge said internal electric circuit supply means from external electric supply means having a voltage less than the voltage of said internal electric supply means, said recharging circuit being connected to said internal electric current supply means and comprising,
      a diode connected in series with said internal electric current supply means whereby current flow is directed in a predetermined direction,
      means connecting said transistor inverter circuit to external electric current supply means whereby said transistor inverter circuit means is energized thereby providing alternating current at said first primary windings, and
      said additional secondary windings of said transformer connected in series with said internal current supply means and adapted to receive the alternating current provided by said first primary windings of said transformer, whereby a voltage higher than that of said internal electric current supply means is supplied thereto thereby recharging said internal electric current supply means.

3. The invention of claim 2 including a wave forming capacitor in parallel with said current limiting resistor in said inverter circuit means.

4. The invention of claim 2 wherein said inverter circuit means provides alternating current to said fluorescent lamp exciting circuit at greater than 10,000 cycles.

5. The invention of claim 2 including a ballast capacitor interposed in said fluorescent lamp exciting circuit whereby said fluorescent lamp, after initial starting, operates at a low energy consumption.

6. The invention of claim 2 wherein said inverter circuit means includes switch means whereby said fluorescent lamp exciting circuit is adapted to be energized by the external electric current supply means.

References Cited

UNITED STATES PATENTS

| | | | |
|---|---|---|---|
| 2,880,306 | 3/1959 | Witte | 240—10.6 |
| 3,283,144 | 11/1966 | Rogers | 240—51.11 |
| 3,331,958 | 7/1967 | Adler | 240—51.11 |

NORTON ANSHER, *Primary Examiner.*

R. P. GREINER, *Assistant Examiner.*

U.S. Cl. X.R.

240—51.11